United States Patent [19]

Pitkanen

[11] 4,218,036

[45] Aug. 19, 1980

[54] BRACKET FOR MOUNTING A REAR VIEW MIRROR ON A VEHICLE

[75] Inventor: Clarence O. Pitkanen, Minneapolis, Minn.

[73] Assignee: Re-Trac Corporation, Minneapolis, Mich.

[21] Appl. No.: 937,333

[22] Filed: Aug. 28, 1978

[51] Int. Cl.³ .............................................. B60R 1/06
[52] U.S. Cl. ............................................... 248/475 B
[58] Field of Search ........... 248/291, 293, 294, 475 B, 248/477, 478, 486, 476, , 479, 480; 403/96

[56] References Cited

U.S. PATENT DOCUMENTS

| | | | |
|---|---|---|---|
| 1,537,649 | 5/1925 | McGlashan et al. | 403/96 X |
| 2,922,669 | 1/1960 | Hansen | 403/96 |
| 2,969,715 | 1/1961 | Mosby | 248/478 |
| 3,119,591 | 1/1964 | Malecki | 403/96 X |
| 3,833,198 | 9/1974 | Holzman | 248/476 |

Primary Examiner—William H. Schultz
Attorney, Agent, or Firm—Douglas L. Carlsen; Michael E. Kiteck, Jr.

[57] ABSTRACT

A bracket for mounting a rear view mirror on a vehicle and which includes two interpivoted bracket frame members which have facing series of radially extending teeth or the like arranged in spring tensioned yieldable but interlocking relationship, the positioning of a washer between the members having an interock relation with each such series of teeth to transmit the interlock from teeth extending in one radial direction on one frame member to teeth extending in a different radial direction on the other member.

1 Claim, 4 Drawing Figures

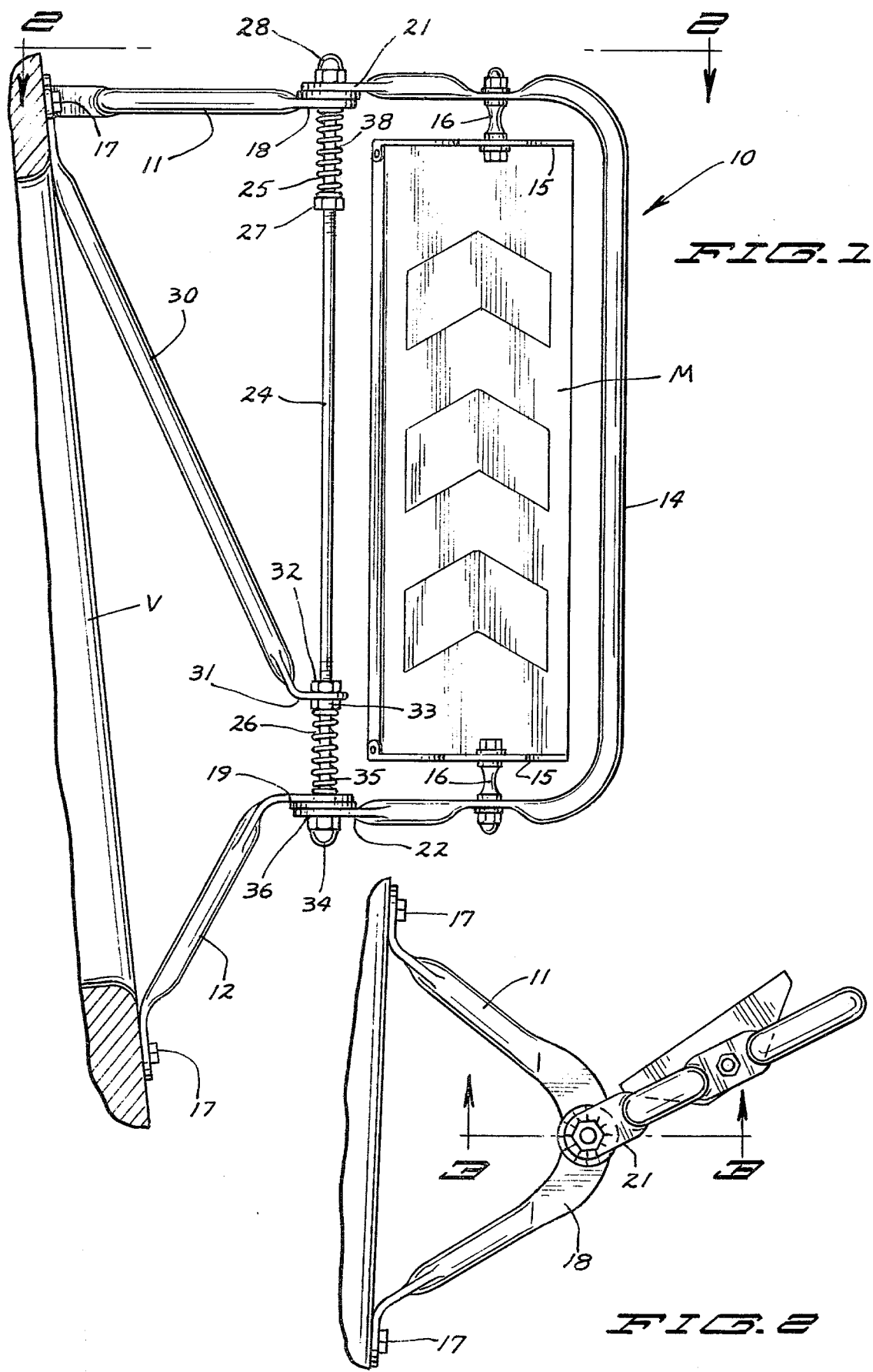

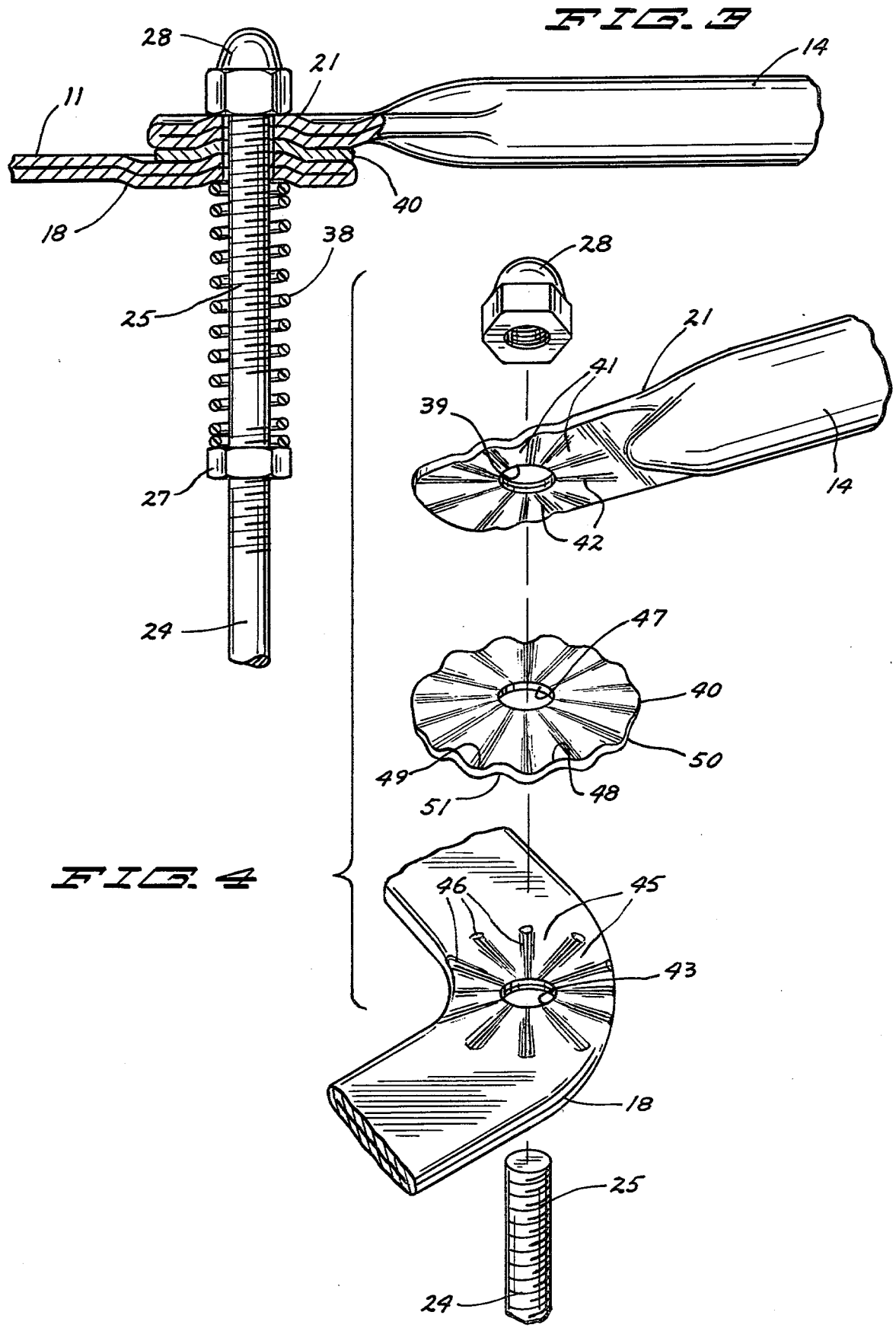

BRACKET FOR MOUNTING A REAR VIEW MIRROR ON A VEHICLE

BACKGROUND OF THE INVENTION

Vehicle mirrors which are mounted to extend a substantial distance beyond the lateral limits of the vehicle on which they are mounted are frequently susceptible to damage as they may be brought into accidental engagement with building walls or other extraneous obstacles. Accordingly, it is common to build the mirror supporting framework of a first bracket which is rigidly connected to the vehicle body, generally on the side of the cab, and a second bracket member which carries the mirror itself and is pivotally connected on a generally upright axis to the first bracket member for folding movement to an inner or collapsed position when a fixed obstacle is contacted.

Many of these mirrors are provided with ratchet type pivot mechanism such as by facing series circumferentially spaced interlocking teeth which yieldably lock the mirror in an adjusted position but which upon forcible contact permit collapse without damaging the supporting frame. Examples of such mirror support mechanisms are shown in U.S. Pat. Nos. 2,488,316 and No. 2,969,715, both to Mosby; No. 1,676,896 to Groenenstein; No. 1,921,310 to Crisma; and No. 2,701,113 to Koonter.

While the aforementioned structures do permit the desired folding of the mirror frame to a collapsed condition the structures involved are either expensive to manufacture or do not provide maximum surface area locking engagement between the interlocking teeth surfaces involved.

SUMMARY OF THE INVENTION

An object of the present invention is to provide a new and improved pivot construction for mounting a rear view mirror on a vehicle.

More specifically the object of the invention is to provide a bracket for mounting an exterior rear view mirror on a vehicle which has mirror frame pivot means and wherein the pivot means includes facing and yieldably interlocking series of circumferentially spaced teeth which are stamped in the interpivoted parts and having means interposed between the parts to increase the interlocking engagement therebetween.

With these and other objects in view, the invention broadly comprises a rear view mirror having interpivoted frame portions formed of flattened tubular material with said portions having interlocking radially corrugated teeth coined therein. A washer also having radial teeth is interposed between said portions to increase or broaden the frictional interlocking engagement therebetween.

BRIEF DESCRIPTION OF THE DRAWINGS

In the drawings:

FIG. 1 is a front elevation of a rear view mirror mounted on the left side of a vehicle cab with the mirror mounting bracket incorporating the present invention.

FIG. 2 is a plan view of the top portion of the mirror mounting bracket taken on line 2—2 of FIG. 1 and looking downwardly.

FIG. 3 is an enlarged fragmentary vertical section taken through the upper portion of the mirror bracket pivot taken on line 3—3 of FIG. 2.

FIG. 4 is a perspective view of the mirror bracket pivot members in exploded condition.

DESCRIPTION OF THE PREFERRED EMBODIMENT

Referring now more particularly to the drawing reference characters will be used to denote like parts or structural features in the different views.

The mirror assembly denoted generally by the numeral 10 is mounted on the vehicle V in a position generally at one side of the driver's compartment with the mirror M in rearwardly facing position to enable the vehicle operator to observe other vehicles or the like to the rear or sides of the vehicle.

The mounting bracket for the mirror M includes an upper V-shaped bracket denoted generally at 11, a lower also V-shaped bracket 12, and a U-shaped frame 14. Mirror M has flanges 15 which are secured to the leg portions of frame 14 by suitable coaxial nut, bolt and spacer assemblies 16 which permit adjustment of mirror M within frame 14 about a substantially vertical axis.

Members 11, 12 and 14 are all formed of tubular metal material. The brackets 11 and 12 have flattened end portions which are secured to the vehicle V as by bolts 17 so that the central portions of the brackets are in substantial vertical alignment. These central portions designated at 18 on bracket 11 and at 19 on braket 12 are flattened to lie on parallel substantially horizontal planes when the brackets are mounted on the vehicle.

The terminal portions of the mirror frame 14 respectively designated upper and lower by the numbers 21 and 22 are also flattened and spaced to lie in close overlapping relationship to the bracket portions 18 and 19.

The flattened bracket and frame portions 18, 19, 21 and 22 are all apertured to receive a pivot rod 24 connecting frame 14 to the brackets 11 and 12. Rod 24 has both ends threaded as at 25 and 26 for substantial distance. The threaded portion 25 carries a nut 27 and extends through the apertures, later defined, in portions 18 and 21 with a cap nut 28 on the upper end thereof.

A diagonal brace 30 has its upper end connected to bracket 11 and the vehicle as by a bolt 17 and its lower end portion 31 is flattened and apertured to receive rod 24. The threaded portion 26 of rod 24 carries nuts 32 and 33 which hold brace portion 31 securely between them. The rod portion 26 extends through apertures in bracket and frame portions 19 and 22 and has a cap nut 34 on the lower end thereof.

A compression coil spring 35 encircling rod 24 is held under compression between the nut 33 and bracket portion 19. A washer 36 is interposed between the flattened bracket portions 19 and 22 and accordingly spring 35 acts to yieldably retain the structural members 19, 36 and 22 in firm frictional engagement against the nut 34.

A coil spring comparable to spring 35, herein denoted at 38, is held under compression between the nut 27 and bracket portion 18 to urge such portion upwardly toward frame portion 21 and against nut 28. A washer 40 identical to washer 36 is interposed between the flattened portions 18 and 21.

The pivotal connections between the mirror support frame 14 and the brackets 11 and 12 are identical and accordingly only the upper connection is shown in detail. This will best be understood by reference to FIGS. 3 and 4.

As thus far described the invention is very similar to that disclosed in U.S. Pat. No. 2,969,715. However, the present construction eliminates the connecting terminals between the frame or bracket members and provides a more effective interlock as will be readily understood.

Frame 14 is formed of a single tube and when the terminal portions 21 and 22 are flattened they are stamped or "coined" with an aperture 39 for reception of rod 24 and a series of circumferentially spaced ribs or teeth 41 extending radially from the center of the aperture. These ribs are interspaced by grooves 42 on the underside of the portion 21 of frame 14.

Ribs 41 have a cross sectional convex curvature and increase in width in their extension from aperture 39. It will be noted, however, that ribs 41 do not extend as far crosswise of bracket portion 21 as they do lengthwise thereof. In other words, due to the width of the tubular stock forming frame 14 the ribs 41 extending crosswise thereof are shorter than those extending longitudinally thereof.

Looking then at the area of bracket portion 18 shown in FIG. 4 it will be noted that the stamped or coined portion thereof is identical. Here the ribs 45 have a cross sectional convex curvature and increase in width in their extension from the aperture 43. Ribs 45 are interspaced by grooves 46. Portion 18 has substantially a right angle bend and the ribs 45 in the bisecting area of the bend do not extend as far as the other ribs due to the limited dimension of the stamped tubing.

Washer 40 is stamped or coined with radially extending corrugations to mate with the ribs and grooves in the bracket portions 18 and 21. The washer is circular and has a center aperture 47 for reception of the rod 24. The corrugations 48 and the interspaced grooves 49 respectively mate and frictionally interlock with the grooves 42 and ribs 41 in the member 14. The bottom side of the washer 40 has ribs 50 and grooves 51 which mate and interlock with the grooves 46 and ribs 45 on the portion 18 of bracket member 11.

It will be understood that the spring 38 yieldably retains the members 18, 40 and 21 in tight frictional engagement. The same construction is used on the lower end of the mirror support with spring 35 yieldably holding the bracket portions 19 and 22 against washer 36 which is identical to washer 40.

The washer 40 is free to move with either portion 21 or 18 in the event that the frame 14 contacts an obstruction or it is desirable to adjust the frame about the vertical axis provided by rod 24. This is also true of washer 36.

The washers serve a very useful purpose in broadening the area of contact between the bracket member teeth engaged thereby. As hereinbefore brought out, when the teeth are stamped in the flattened portions of the tubular members some are shorter than others due to the limited width of the tubing. Accordingly without the washer in certain positions of the mirror frame only the longer teeth on one member would be engaged with the shorter grooves in the other. The washer broadens the engagement assuring frictional inerlocking between the long teeth and long grooves to improve the interlocking engagement.

The invention accordingly provides a rear view mounting bracket which economically and effectively carries out the aforementioned objectives.

Having now therefore fully illustrated and described the invention, what I claim to be new and desire to protect by United States Letters Patent is:

1. In a bracket for mounting a rear view mirror on a vehicle and having a support formed of tubular metal material adapted to be integrally connected to the vehicle body, and mirror holding frame also formed of tubular metal material and having a mirror mounted thereon and said support and frame having sections arranged in overlapping position and pivotally interconnected for adjustment of the frame and mirror between different positions about the pivot axis, the improvement which comprises,
   (a) the said overlapping sections of the support and frame having flattened portions perpendicular to and surrounding the aperture axis,
   (b) said flattened portions having facing series of circumferentially spaced ribs extending radially from the apertures,
   (c) a washer member interposed between said flattened portions and about the pivot and having spaced ribs extending radially on both sides thereof adapted to interlock with the ribs on each of said portions, and
   (d) the ribs on said flattened portions having varying lengths while the ribs on the washer are uniform and all at least as long as the longest ribs on the flattened portions.

* * * * *